United States Patent [19]

Kashi

[11] Patent Number: 5,685,720
[45] Date of Patent: Nov. 11, 1997

[54] BRAILLE CELL ASSEMBLY HAVING HOLDER TRAY

[75] Inventor: Mostafa Kashi, Sunnyvale, Calif.

[73] Assignee: Telesensory Corporation, Mountain View, Calif.

[21] Appl. No.: 496,042

[22] Filed: Jun. 28, 1995

[51] Int. Cl.⁶ ............................................. G09B 21/00
[52] U.S. Cl. ............................................. 434/114
[58] Field of Search ........................ 434/114, 113, 434/112; 340/407.1, 407.2

[56] References Cited

U.S. PATENT DOCUMENTS

| | | | |
|---|---|---|---|
| 4,473,356 | 9/1984 | Fernando et al. | 434/114 |
| 4,758,165 | 7/1988 | Tieman et al. | 434/114 |
| 4,871,992 | 10/1989 | Petersen | 434/114 X |
| 5,226,817 | 7/1993 | Nakajima et al. | 434/113 |

FOREIGN PATENT DOCUMENTS 620641  10/1994  European Pat. Off. ......... 434/113

Primary Examiner—Jeffrey A. Smith
Attorney, Agent, or Firm—Majestic, Parsons, Siebert & Hsue

[57] ABSTRACT

A braille cell assembly is described which provides precision cell positioning. Such assembly includes a holder in the form of a tray which engages the individual braille cells, which holder is selected to be capable of itself rigidly maintaining the individual cells in predetermined positions adjacent to one another. The position of each cell in the assembly is thus independent of other cells of the assembly.

6 Claims, 2 Drawing Sheets

BRAILLE CELL ASSEMBLY HAVING HOLDER TRAY

BACKGROUND OF THE INVENTION

This invention relates to braille cell assemblies of the type used by visually impaired individuals to convert representations of information from electrical signals to mechanical movement and vice versa; and more particularly, to an apparatus and a method for maintaining individual braille cells in proper positions in a cell assembly.

Much information now is at some time represented by electrical signals. For example, input/output data and interactive information provided by a computer often is in the form of electrical signals if it does not have to be easily understood by a human. If the information is output information to be read, these electrical signals normally control operation of a display monitor or printer. The information in display or printed form, though, is not readable by a blind person or by many of the visually impaired. For this reason, arrangements have been developed to convert between electrical signal forms of information and braille.

Devices of the above type designed for use with computers are referred to as braille computer display systems. Such systems provide computer processing abilities to the blind and visually handicapped. These systems include an assembly of braille cells. Each individual cell typically includes a plurality of bimorph reeds whose mechanical movements are electrically controlled to convert information between electrical signal representations and desired mechanical movement. The arrangement of individual braille cells of this nature into an assembly provides a system which enables the detection or input of multiple signals by those capable of using braille. Braille cells and their assembly are quite old. U.S. Pat. Nos. 4,473,356 and 4,758,165 describe typical cells.

It is important that the locations of individual braille cells be quite precise. Those that have been available in the past, though, are not as good as is desired in this connection. Many of the problems are caused by the fact that it simply is impossible that cells be made and assembled with exact precision, i.e., dimensional tolerances must be used. In this connection, in most assemblies the individual braille cells rely on contact with adjacent braille cells for positioning. That is, most assemblies are made by threading a plurality of braille cells together on one or more rods. These rods are passed through holes in the frames of the cells. It will be seen that with this construction, adjacent cells rely on contact with one another for positioning in the assembly. In other words, the individual deviations in the braille cells will be added in the assembly, with the result that the assembly itself may depart significantly from desired dimensions.

In view of the above, it is common for each assembly to be manually adjusted by squeezing the cells together. In some instances it is even necessary that an assembler sand or file the sides of selected braille cells in order to make the total assembly be of a certain size. (In some instances it is necessary for the assembler to add shims on the rods to make sure the assembly meets the desired dimension.)

It will be appreciated that the problem is compounded in longer displays—the number of accumulated deviations is, of course, proportional to the number of cells in a display. Long displays also have the problem of buckling, i.e., the longer the rods are the more prone they are to the slight bending that is responsible for buckling.

It will be seen that the problem is exacerbated by handling of the assembly after it is first produced, e.g., handling for packaging and transportation. That is, even after an assembly is adjusted as necessary at the point of manufacture, the length of the assembly may be slightly changed and such assembly must again be adjusted. This is particularly a problem in the normal situation in which it is one manufacturer who makes the braille assembly and it is another that installs it in a reader.

The cells in many prior assemblies also change position over time—these assemblies simply do not have the rigidity necessary to maintain a set position.

SUMMARY OF THE INVENTION

The present invention provides a braille cell assembly which has and maintains precision cell positioning. Such braille cell assembly includes a holder selected to be capable of itself rigidly maintaining the individual cells in predetermined positions adjacent one another.

It has been found that with use of such a holder, the precision in positioning is achieved without reliance at all on the cells themselves. As will be discussed in more detail hereinafter, although the holder of the invention is particularly useful because it circumvents the accumulation of deviations in one direction because of adjacent cells defining positions in an assembly, the holder provides support in three different orthogonal directions. The result is that the desired precision in positioning is achieved simply on the basis of the precision provided by the holder alone and its interface with the remainder of the structure. This precision is, in essence, provided to all of the braille cells making up the assembly. Moreover, the individual cells are removable for repair or replacement without disturbing the precise positioning of other cells.

Most desirably, the holder is a tray, and it provides the rigidity by engaging each of the cells at two or more spaced positions. The interlocking structure which does this includes a flange on such tray and a complementary slot on each of the individual cells. In this connection, each of the cells includes a support frame which defines the slot and has a notch projection therewithin which engages a complementary reception notch in the flange.

The invention includes not only the physical structure itself, but a method of forming a braille cell assembly which assures that the braille cells are maintained in position.

Other features and advantages of the invention either will become apparent or will be described in connection with the following, more detailed description of a preferred embodiment of the invention and variations.

BRIEF DESCRIPTION OF THE DRAWING

With reference to the accompanying drawing.

DETAILED DESCRIPTION OF THE PREFERRED EMBODIMENT

The following relatively detailed description is provided to satisfy the patent statutes. It will be appreciated by those skilled in the art that various changes and modifications that are not mentioned can be made without departing from the invention.

Figure 1:
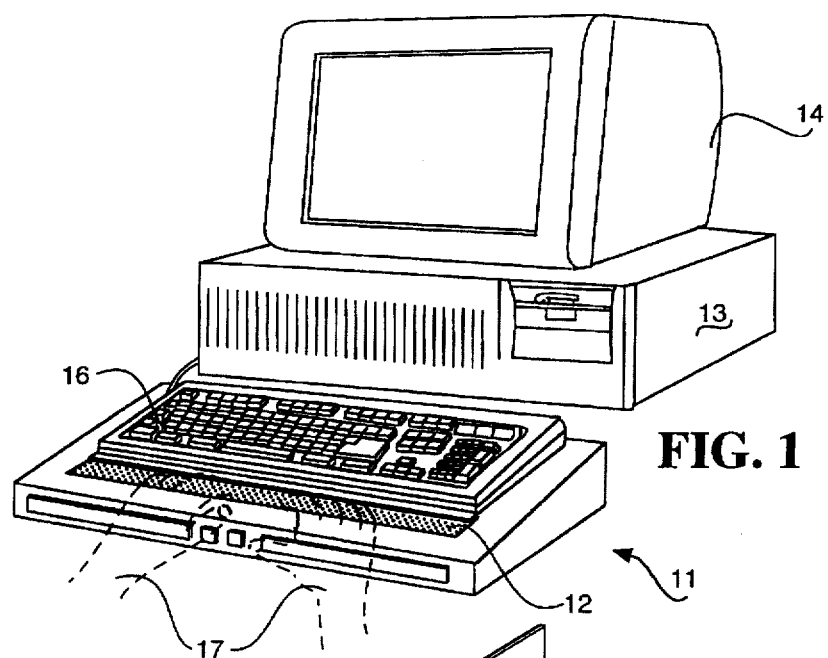
FIG. 1 is an isometric view of a braille computer display system incorporating a preferred embodiment of the invention.

FIG. 1 illustrates a computer braille display device 11 incorporating a preferred embodiment of a braille assembly 12 of the invention, in combination with a standard computer. Such computer is made up of the typical computer enclosure 13, a display monitor 14, and an input/output keyboard 16. As is illustrated, the keyboard is mounted on the braille display device just above the braille assembly. An operator's hands, represented in phantom at 17, then can easily shift between braille input/output and the keyboard for operation, for example, of cursor control and function control keys.

Figure 2:
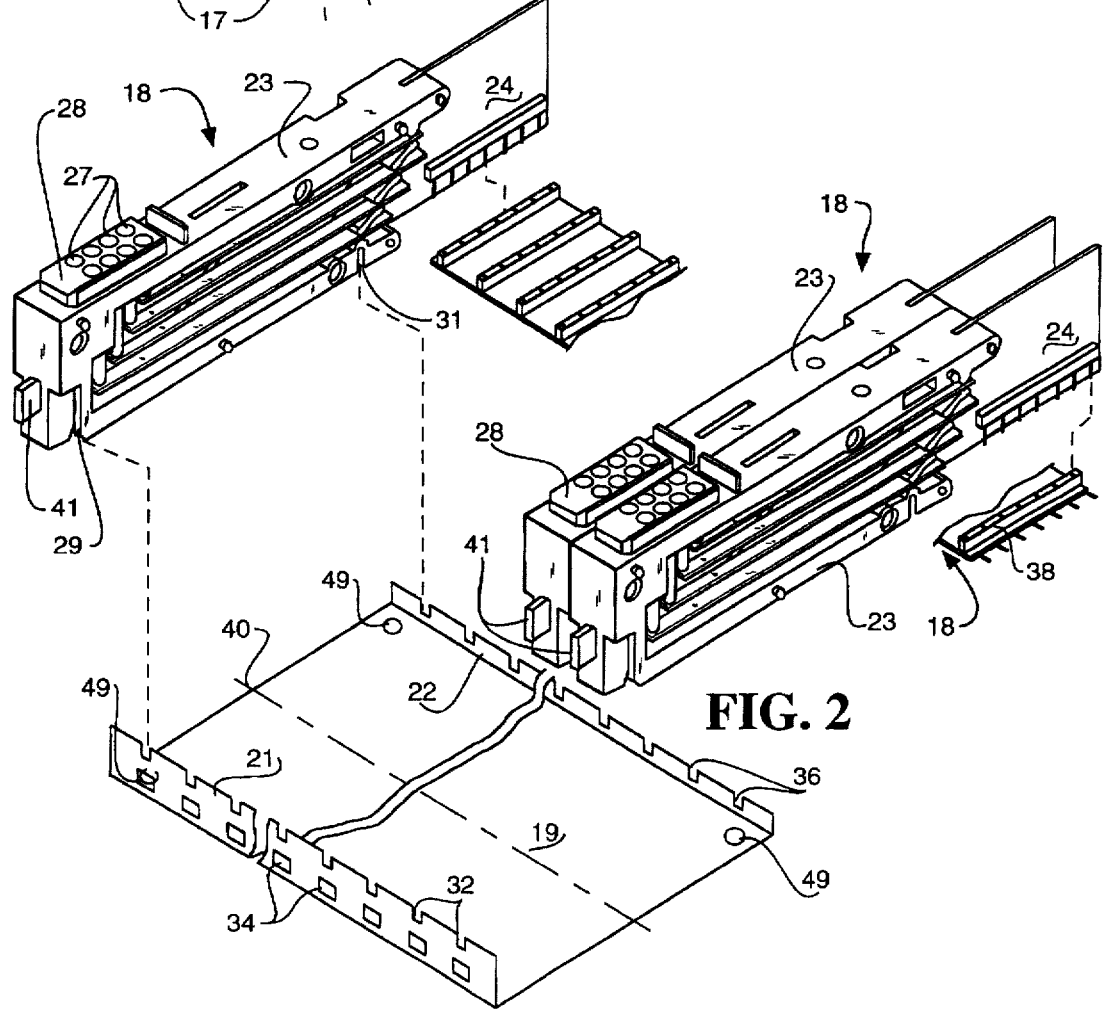
FIG. 2 is an overall isometric and exploded view of such preferred embodiment.
Figure 3:
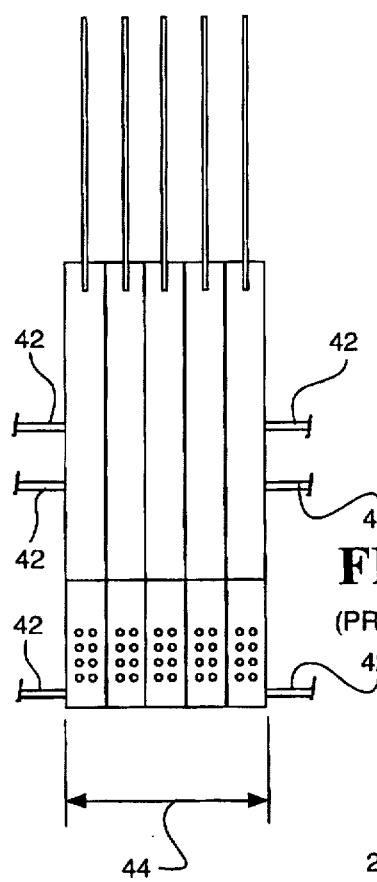
FIG. 3 is a broken away, top elevation view of a prior art braille assembly, which view is being included to emphasize the importance of the instant invention.

The preferred embodiment of the braille cell assembly of the invention is illustrated in detail by the other figures (except for FIG. 3, which shows the prior art). The assembly is made up not only of individual braille cells as illustrated at 18, but also a holder tray 19 for such cells. As can be seen best from FIG. 2, the longitudinal edges of the tray are upwardly bent to form spaced apart flanges 21 and 22. Each of the braille cells is itself made up of a support frame 23 and a printed circuit board 24 having the circuitry needed by the individual cell to convert electrical signals into movement of its bimorph reeds 26 which, in turn, move braille sensor pins 27 inward and outward relative to a cap 28. It is this movement of the sensor pins which is detected by the finger of an operator.

Each braille cell support frame 23 has a pair of slots 29 and 31 which are complementary to receive the flanges 21 and 22, respectively. The spacing between the slots is the same as the spacing between the flanges so that both slots can engage their respective flanges simultaneously.

Figure 7:
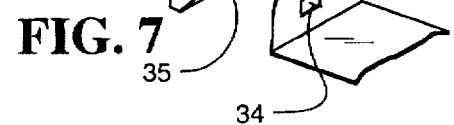
FIG. 7 is a further enlarged broken away and exploded view of a portion of the preferred embodiment, taken on a plane indicated by the line 7—7 in FIG. 6.

Flange 21 includes a plurality of notches 32 which are spaced apart along its length by the same distance it is desired the center planes of the cell support frames 23 also be spaced apart. As best illustrated in FIG. 7, each slot 29 includes a notch projection 33 which engages in an associated slot 32 when the cell is in an appropriate position. Moreover, a plurality of holes 34 are provided extending through flange 21, respectively centered beneath associated notches 32. As an important aspect of the assembly, each of the slots 29 further includes a projecting nub 35 which fits within an associated hole 34 when a cell is in an appropriate position.

Reception notches 36 are also provided in the other flange 22, which reception notches register with corresponding notch projections 37 (FIG. 6) within each of the slots 31 as illustrated.

A strip motherboard represented at 38 is also provided adjacent the tray for reception of the printed circuit boards of the individual cells. It should be noted that while it is common to provide such a motherboard for the cells, in the past such boards have engaged the individual cells at the end of the cell circuit boards, rather than at the bottom.

It will be seen from the above that each of the cells is maintained individually by the tray in a set position orthogonal to the axis of such tray, which axis is represented in FIG. 2 by the reference numeral 40. The positioning of each cell is not affected from the mechanical standpoint by the positioning of such cell's neighbors. This has several advantages. For one, it takes away the possibility that any deviation of a cell from a desired exact width dimension will affect the positioning of adjacent cells. For another, it makes it possible to remove an individual cell from the holder tray without disturbing the positioning of others. This removal can be accomplished by simply withdrawing a cell's projection 35 on its support frame from its registering hole on the tray flange 21. This enables a cell to removed for repair or replacement without disturbing the positioning of any other cells—positioning is provided by the tray 19, not by adjacent cells.

To facilitate removal of the individual cells from an assembly, it is preferable that the support frame 23 of the individual cells be made of a somewhat resilient plastic material. This will enable the slot 29 of a cell to be expanded to the extent necessary to free it from the support frame.

Figure 4:
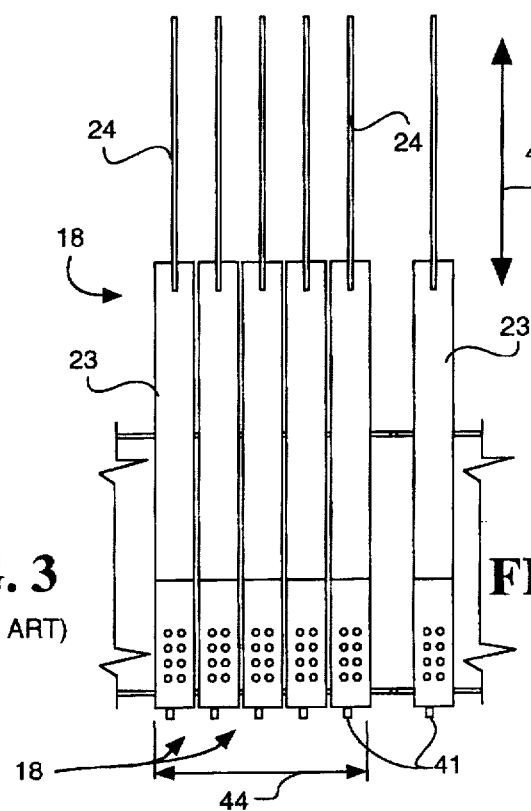
FIG. 4 is a broken away, top elevation view of the preferred embodiment of the invention, which view is similar to that of FIG. 3.

In some instances, it is desirable that several different assembly sections be provided, which assemblies are separated from one another. One tray can accommodate more than one of such sections, and it will be recognized that the tray will maintain the desired distances between such sections. FIG. 4 shows cells separated from one another, not only to emphasize the independence in positioning of the individual cells, but also to illustrate separation of different cell section(s).

It must also be remembered that the nub on the individual cells can simply be a detent which engages a corresponding indent (the hole may not extend all the way through) on the tray flange. Each of the individual cells may also include an alignment tab 41 if desired to facilitate alignment during assembly with the remainder of a computer braille display device.

Figure 6:
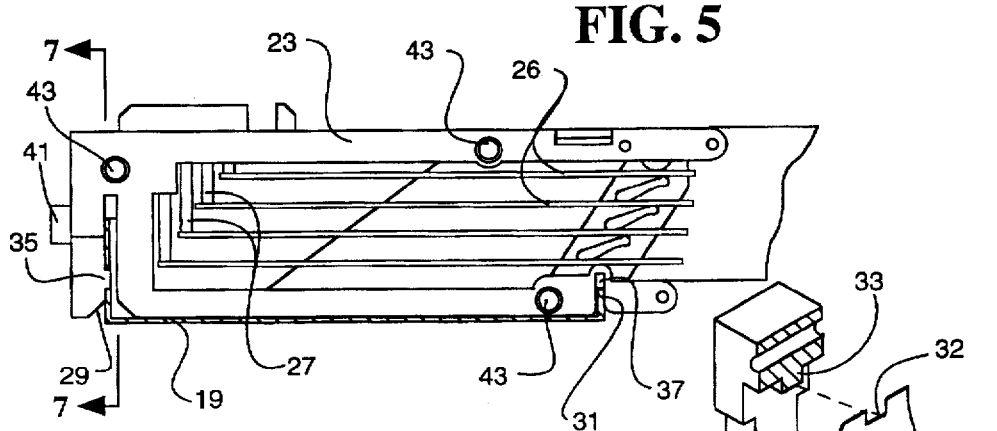
FIG. 6 is an enlarged sectional view of the preferred embodiment of the invention illustrated in the other figures.

As pointed out above, in the past braille cell assemblies have been made by threading long rods through registering holes in adjacent individual cells. FIG. 3 is a top view of a partial assembly formed in this manner. The rods are represented at 42 and the through holes in the individual cells through which such rods extend, are represented at 43 (FIG. 6). It will be seen that the positioning of every cell is dependent upon the positioning of the adjacent cells. Since each cell itself cannot, as a practical matter, be precisely dimensioned in its width direction (have no tolerance leeway at all), the dimension of an assembly along the assembly length (the individual cell width) as represented by dimensional arrow 44 is completely unpredictable. Because of such it has been the practice in an effort to circumvent this problem for the assembler to "squeeze" the cells by use of end brackets on the rods to achieve a desired dimension. (In some instances, the assembler has to file or sand the width of individual cells, or insert shims, to achieve such desired dimension.) The provision of a separate rigid holder for the individual cells assemblies alleviates this problem. It is the holder which defines the assembly dimensions in the direction 44.

In this preferred embodiment in which the holder is a tray, it is the tray which maintains the individual cells in precise positions. The projecting nubs 35 are only slightly smaller than the holes 34 in the flange 21 within which they fit, with the result that there is very little movement of the cells relative to the tray. The tray itself is rigidly installed in the enclosure of the computer display system via holes 49 adjacent the tray ends. The use of the tray facilitates handling of the display and, in contrast to a situation in which a tray is not utilized, reduces the likelihood that handling will change the assembly dimensions. It should be noted that although a set length of tray is illustrated in this preferred embodiment, in those situations in which a manufacturer may wish to accommodate different tray lengths, different hole patterns can be provided along the tray length as required to enable customization of the length relative to the casing, simply by cutting the tray.

There are many other advantages to the use of a separate holder, as discussed at the beginning of the patent application. One of these is particularly important. The individual cells can be removed or replaced without interfering with the other cells. That is, it is unnecessary to unthread the rods and then again go through the whole adjustment procedure simply to remove one cell for repair or other purposes.

Figure 5:
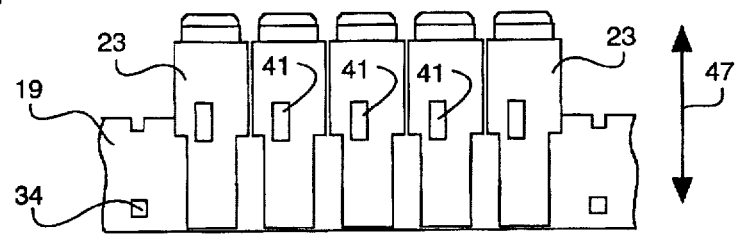
FIG. 5 is a front elevation view of the preferred embodiment of the invention shown in the earlier figures.

It should be noted that utilization of the holder of the invention also assures that the individual braille cells are maintained in a set position both upward and downward, and longitudinally of the cell in the directions represented respectively in FIGS. 4 and 5 by the arrows 46 and 47.

It should also be noted that it is contemplated that in some instances it may be desired to use elongated rods as shown in FIG. 3 in combination with the instant invention. This possibility is one of the reasons why the frames 23 of the individual cells are provided with the holes 43. It also may be desired to use the holes to maintain the adjacent cells at the ends of assemblies secured to one another via cell tapping screws or the like.

As mentioned at the beginning of the detailed description, applicant is not limited to the specific embodiment and variations described above. They are exemplary, rather than exhaustive. The claims, their equivalents and their equivalent language define the scope of protection. The invention includes not only the braille cell assembly as described but the method of forming the same which is also described to the extent it differs from a standard method.

What is claimed is:

1. In a braille cell assembly, the combination comprising:
   (a) a plurality of individual braille cells;
   (b) a holder engaging said braille cells, which holder is selected to be capable of itself rigidly maintaining each of said individual cells in a predetermined position adjacent other cells without relying for positioning on such other cells; and
   (c) interlocking structure on said cells and said holder for maintaining said cells in said predetermined positions, said interlocking structure including a flange on said holder, and each of said cells includes a support frame defining a slot which is complementary to said flange and engageable therewith.

2. The braille cell assembly of claim 1 wherein said interlocking structure further includes a notch projection in each support frame slot, engageable within a complementary reception notch in said flange.

3. The braille cell assembly of claim 2 wherein said interlocking structure further includes a projecting nub in each support frame slot engageable within a complementary hole in said flange.

4. The braille cell assembly of claim 1 wherein said interlocking structure includes a pair of flanges that are spaced from one another by said holder, and each of said cells includes a pair of slots at spaced positions respectively complementary to said flanges.

5. In a braille cell assembly, the combination comprising:
   (a) a plurality of individual braille cells;
   (b) a tray engaging said braille cells and maintaining the same adjacent one another; and
   (c) interlocking structure on said cells and said tray for maintaining each of said cells in a predetermined position relative to other of said cells, said interlocking structure including a flange on said tray and each of said cells including a support frame defining a slot which is complementary to said flange and engageable therewith, and wherein said interlocking structure further includes a notch projection in each support frame slot engageable within a complementary reception notch in said flange.

6. In a braille cell assembly, the combination comprising:
   (a) a plurality of individual braille cells;
   (b) a tray engaging said braille cells and maintaining the same adjacent one another; and
   (c) interlocking structure on said cells and said tray for maintaining each of said cells in a predetermined position relative to other of said cells, said interlocking structure including a flange on said tray and each of said cells including a support frame defining a slot which is complementary to said flange and engageable therewith, and wherein said interlocking structure further includes a projecting nub in each support frame slot engageable within a complementary hole in said flange.

* * * * *